Aug. 22, 1961 R. C. LAMY 2,997,692

BINARY COMPARATOR

Filed Jan. 30, 1959

INVENTOR.
RICHARD C. LAMY

BY *Wesley De Bruin*

ATTORNEY

United States Patent Office 2,997,692
Patented Aug. 22, 1961

2,997,692
BINARY COMPARATOR

Richard C. Lamy, Poughkeepsie, N.Y., assignor to International Business Machines Corporation, New York, N.Y., a corporation of New York Filed Jan. 30, 1959, Ser. No. 790,107
4 Claims. (Cl. 340—149)

This invention relates to binary number comparators and has for its object the provision of a simple and reliable comparator providing a positive and instantaneous comparison of two binary numbers and developing one output voltage signal in response to a lack of identity and a different output voltage signal in response to an identity of two numbers being compared one with the other.

A primary object of this invention is to provide a binary numbers comparator that is highly reliable in operation, and is simple and inexpensive to construct.

A further object is to provide a comparator, employing a minimum number of bistable magnetic elements, for comparing one binary number with each of a series of binary numbers to determine which, if any, of the binary numbers are identical and for producing a different output voltage signal for identity and non-identity of the numbers being compared.

A still further object is to provide a comparator, employing a minimum number of bistable magnetic elements, for comparing the characters of two binary numbers one with the other and for developing a different output signal for identity and non-identity of the characters compared.

A still further object is to provide a binary numbers comparator that is an improvement of the devices disclosed, respectively, in the R. A. Edwards Patent No. 2,615,127 and the S. B. Wollard Patent No. 2,641,696.

Other objects of the invention will be pointed out in the following description and claims and illustrated in the accompanying drawings, which disclose, by way of example, the principle of the invention and the best mode, which has been contemplated, of applying that principle.

In general, the invention comprises a plurality of comparator stages, connections for connecting each stage to separate selective sources of voltage to represent in each stage the corresponding digits of two binary numbers, and common output means and bistable magnetic means electro-magnetically interconnecting the stages to provide cooperation therein in producing one output voltage signal in response to a lack of identity of the two binary numbers being compared and a second voltage signal in response to an identity thereof.

Figure 1:
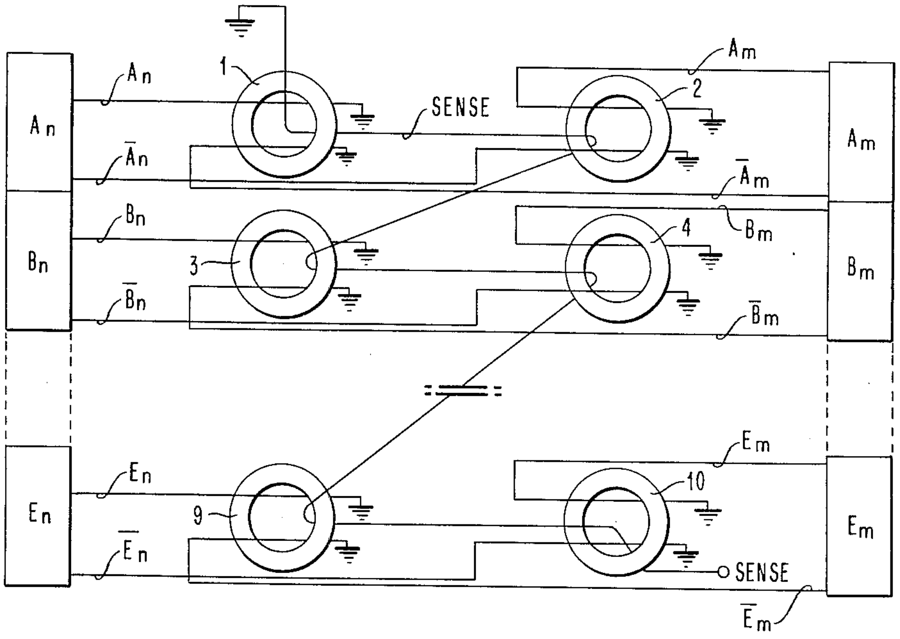
FIG. 1 shows a diagrammatical view of a structural embodiment for practicing applicant's invention.

Before describing the preferred form of the invention, certain properties of so-called rectangular hysteresis material will be explained. FIG. 1A is a B—H curve of a high hysteresis magnetic material with its rectangular properties emphasized for purposes of explanation. The points A and D represent conditions of zero applied magnetomotive force wherein the core acts as a permanent magnet after excitation by a current flowing in one direction or the other through windings around the core. For example, at point A the flux is as indicated, namely, in a "positive" direction after a positive magnetomotive force of sufficient magnitude has been applied and removed. Point D represents the permanent magnet condition with the flux in the opposite direction after a sufficient negative magnetomotive force, the result of a current in the opposite direction, has been applied and removed. Referring now to the point D, it will be evident that a magnetizing force $H_1$, no matter how often applied and removed, will not materially affect the core, since the only result will be to carry the material through the minor hysteresis loop L. Application of magnetizing force sufficiently greater $H_c$ will result in reversal of the field. Thus, if instead of a magnetizing force $H_1$, a force of $2H_1$ is applied and then removed the state will go from D to A, that is, there will be a complete reversal of flux in the core. In the same manner a force of $-2H_1$ produced by the application and removal of the same current in the opposite direction will change the core from state A to state D.

The material chosen must show a curve of sufficient breadth to make practicable the use of two such currents, and the transition part of the curve must take place primarily between the values $H_1$ and $2H_1$ and thus must be relatively steep. This results in a "rectangular" hysteresis material. Of major important is the fact that repeated applications of a current producing a force less than $H_c$ (for example $H_1$) will not materially affect the state of the core.

Materials having an almost rectangular hysteresis loop have been used to store electrical information. In these applications, the existence of the core at states A and D is said to correspond to the storage of the binary digits 0 and 1 (or 1 and 0). The digit is placed in the core by passing a current of intensity sufficiently greater than $H_c$ in the proper direction through the coil. To read the information stored in a given coil a current sufficiently greater than $H_c$ is again applied either in the direction designated as positive or in the direction chosen as negative. If the reading force (i.e. current) is "positive" and the core was at state A to begin with, there will be little change in flux density or direction due to the applied current and only a small voltage in the output circuit. Conversely, if the core was at state D and a strong positive H, exceeding $H_c$ is applied, the field will reverse to state A with an attendant strong output. The output will thus depend on whether the core stored a 0 or a 1. Since reading is exactly the same as writing, the reading will erase whatever was written and will leave the core in that state which corresponds to the direction of the reading current. However, if desired, the previously stored information can be rewritten.

Figure 1A:
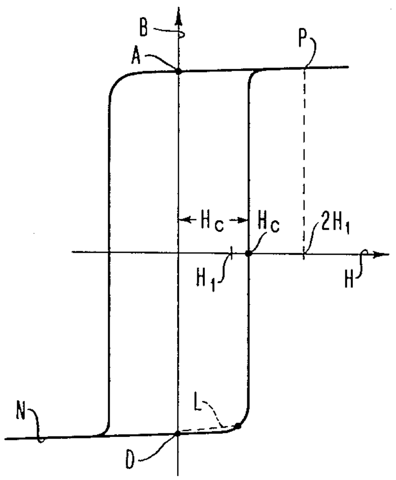
FIG. 1A shows an approximately hysteresis curve for a suitable magnetic material.

Referring to FIG. 1 of the drawings, a preferred embodiment of applicant's invention will be described. The blocks $A_n$, $B_n$ through $E_n$ represent a first source of electrical manifestations representative of a first binary word. Correspondingly, the blocks $A_m$, $B_m$ through $E_m$ represent a second source of electrical manifestations representative of a second binary word. These sources respectively provide electrical manifestations $A_n$, $\overline{A}_n$, $B_n$, $\overline{B}_n$ through $E_n$, $\overline{E}_n$ and $A_m$, $\overline{A}_m$, $B_m$, $\overline{B}_m$ through $E_m$, $\overline{E}_m$ on the leads bearing corresponding reference characters. The first source and the second source represented by the blocks $A_n$ through $E_n$, and $A_m$ through $E_m$ may respectively be any well known structure. For example, these sources may be a transistorized drive circuit arrangement, or a core register, or any device known to the prior art that will render complementary binary manifestations representative of a binary value. Further, from FIG. 1, it will be seen that lead $A_n$ and lead $\overline{A}_n$, from block $A_n$, are respectively electro-magnetically coupled to cores 1 and 2. Correspondingly, lead $A_m$ and lead $\overline{A}_m$, from block $A_m$, are respectively electro-magnetically coupled to cores 2 and 1. As shown in FIG. 1 leads $B_n$, $\overline{B}_n$ through $E_n$, $\overline{E}_n$ and leads $B_m$, $\overline{B}_m$ through $E_m$, $\overline{E}_m$ are correspondingly electro-magnetically coupled to cores 3 through 10. Namely, lead $B_n$ and lead $\overline{B}_n$, of block or binary position $B_n$, are respectively electro-magnetically coupled to cores 3 and 4, as shown in FIG. 1. Correspondingly, lead $B_m$ and lead $\overline{B}_m$, of block or binary position $B_m$, are respectively electro-magnetically coupled to cores 4 and 3, as shown in FIG. 1. Likewise, lead $E_n$ and lead $\overline{E}_n$, of block or binary position $E_n$, are respectively electro-magnetically coupled to cores 9 and 10, as shown in FIG. 1. Correspondingly, leads $E_m$ and $\overline{E}_m$ of block or binary position $E_m$, are respectively electro-magnetically coupled to cores 10 and 9 of FIG. 1.

Merely, for purposes of explanation, let it be assumed that blocks $A_n$, $\overline{A}_n$, $B_n$, $\overline{B}_n$ through $E_n$, $\overline{E}_n$ and blocks $A_m$, $\overline{A}_m$, $B_m$, $\overline{B}_m$ through $E_m$, $\overline{E}_m$ respectively represent transistorized register drivers adapted to electrically manifest in complementary binary notation a first and a second binary word, respectively. Now, let it further be assumed that for each position of each register driver a binary "1" is electrically manifested by a potential of positive polarity on the upper lead and a negative potential on the lower lead. Correspondingly, assume that for each position of each register driver a binary "0" is electrically manifested by a potential of positive polarity on the lower lead and a negative potential on the upper lead. For example, referring to binary position $A_n$, binary "1" is represented by a positive potential on lead $A_n$ and a negative potential on lead $\overline{A}_n$. For purposes of illustration, these conditions are set forth below in Chart 1. In Chart 1 a plus sign represents a positive potential and a negative sign represents a negative potential.

*Chart 1*

| Lead | Binary "1" | Binary "0" |
|---|---|---|
| $A_n$ or $A_m$ | + | − |
| $\overline{A}_n$ or $\overline{A}_m$ | − | + |
| $B_n$ or $B_m$ | + | − |
| $\overline{B}_n$ or $\overline{B}_m$ | − | + |
| $C_n$ or $C_m$ | + | − |
| $\overline{C}_n$ or $\overline{C}_m$ | − | + |
| $D_n$ or $D_m$ | + | − |
| $\overline{D}_n$ or $\overline{D}_m$ | − | + |
| $E_n$ or $E_m$ | + | − |
| $\overline{E}_n$ or $\overline{E}_m$ | − | + |

From the subsequent description of applicant's invention, it will be appreciated that the magnitudes of the positive and negative potentials need bear no rigorous relationship, i.e., the positive potential does not necessarily have to be equal to the negative potential but either one may be greater than the other and the practice of applicant's invention may be accomplished.

Still referring to FIG. 1, it will be seen that a sense wire is electro-magnetically coupled to cores 1 through 10. Further, this sense wire is coupled to each of said cores in the same magnetic sense or polarity. It will also be appreciated at this time that a separate set wire may be employed to set each of the cores in either state, namely, D or A of FIG. 1A. However, the setting of cores 1 through 9 to the D state, or the A state, may be accomplished by the passing of a suitable current of appropriate direction through the sense wire shown in FIG. 1.

Now for purposes of explanation, consider only binary positions $A_n$ and $A_m$ in conjunction with cores 1 and 2. Let it be assumed that binary position $A_n$ electrically manifests a binary "1" and binary position $A_m$ electrically manifests a binary "1." Then it follows that lead $A_n$ and lead $A_m$ will respectively have a positive potential thereon, whereas lead $\overline{A}_n$ and lead $\overline{A}_m$ will respectively have a negative potential input thereon. Further, assume that cores 1 and 2 are respectively in their D position (FIG. 1A) of remanent flux. Thus it will be seen that the positive potential of lead $A_n$ impresses a positive magnetomotive force on core 1 and the positive potential on lead $A_m$ impresses a positive magnetmotive force on core 2. However, the negative potential on lead $\overline{A}_m$ impresses a negative magnetomotive force on core 1 which appreciably cancels the positive magnetomotive force impressed on core 1 by the positive potential on lead $A_m$. Thus, for all practical purposes, the condition of core 1 does not change, namely, core 1 remains in remanent state D. Correspondingly, the positive magnetomotive force impressed on core 2 by the positive potential on lead $A_m$ is offset by the negative magnetomotive force impressed on core 2 by the negative potential on lead $\overline{A}_n$. Thus, the remanent state of core 2 does not change for all practical purposes, but remains at remanent state D, as shown in FIG. 1A.

The foregoing conditions may readily be seen from an inspection of FIG. 1A. As stated earlier herein, a magnetomotive force greater than $H_c$ (FIG. 1A) is needed to cause the core to switch from remanent state D to remanent state A. Recognizing that the positive potential on lead $A_n$ applies a positive magnetomotive force of approximately $H_1$ on core 1, then it will be appreciated that any negative magnetomotive force impressed upon core 1, as a result of the negative potential impressed upon lead $\overline{A}_m$, will reduce the positive magnetomotive force impressed on core 1 to a value less than $H_1$. Thus, it will be seen that even if the negative magnetomotive force, due to the negative potential impressed on lead $\overline{A}_m$, is very small, the core 1 will traverse, nothing more than a minor hysteresis loop of the order L, as shown in FIG. 1A. Correspondingly, the positive potential on lead $A_m$ will tend to drive core 2 from its remanent state D to the point P of the hysteresis curve of FIG. 1A. However, the positive magnetomotive force due to the positive potential impressed on lead $A_m$ (being of the order of $H_1$ of FIG. 1A) is too small to drive the core 2 from remanent state D to remanent state A. Further, the negative potential impressed on the lead $\overline{A}_n$ results in a negative magnetomotive force which counteracts, in part at least, the positive magnetomotive force due the positive potential impressed on lead $A_m$. Thus, under the conditions assume earlier herein core 2, at most, traverses a very minor hysteresis loop of the order L, or less, shown in FIG. 1A.

Now, let it be assumed that a binary "1" is electrically manifested by binary position $A_n$, a binary "0" is electrically manifested by binary position $A_m$, and cores 1 and 2 are respectively in remanent state D. Referring to Chart I, set-forth earlier herein, it will be seen that leads $A_n$ and $\overline{A}_m$ each have a positive potential impressed thereon, whereas leads $A_m$ and $\overline{A}_n$ each have a negative potential impressed thereon. Thus, core 1 will be subjected to a positive magnetomotive force of approximately $H_1+H_1$, respectively, due to the positive potentials impressed on leads $A_n$ and $\overline{A}_m$. Hence, core 1 will switch from remanent state D to the vicinity of points P of the hysteresis curve (FIG. 1A), and in so doing will induce an appreciable potential on the sense line electromagnetically coupled to core 1. The negative potentials impressed respectively on leads $\overline{A}_n$ and $A_m$ results in a negative magnetomotive force being impressed on core 2. This causes the flux of core 2 to traverse the hysteresis loop of FIG. 1A from point D to, or in the direction of, point N. It will be seen that a traversal of the hysteresis loop from point D to point N (FIG. 1A) results in very little, if any, change of flux. Thus, a very small voltage, if any, from a practical standpoint, will be induced in the sense wire as a result of the change in flux of core 2: whereas, the traversal by core 1 of the hysteresis curve from point D to point P results in a relatively great change of flux and hence a relatively substantial voltage will be induced thereby in the sense lead or winding. The inducing of a relatively large voltage impulse on the sense wire by core 1 manifests the condition that the value, namely, a binary "1," electrically manifested by binary position $A_n$ is not equal to the value, namely, binary "0" electrically manifested by binary position $A_m$.

At this point, it will be appreciated that the negative magnetomotive force, due to a negative potential may be very small, approaching zero, whereas, the positive magnetomotive force due to a positive potential is preferably of the order of $H_1$, as shown in FIG. 1A. As will be apparent to those skilled in the art, the conditions may be stated more broadly as follows: For the condition of identical values electrically manifested by binary positions $A_n$ and $A_m$, cores 1 and 2 are respectively subjected to a positive magnetomotive force of approximately the order of $H_1$ (FIG. 1A) and less than $H_c$ in magnitude.

As a further example of the operation of applicant's invention, reference is made to FIG. 1, and the assumptions that: a binary "1" is electrically manifested by binary position $A_n$; a binary "0" is electrically manifested by binary position $B_n$; a binary "1" is electrically manifested by binary position $E_n$; a binary "1" is electrically manifested by binary position $A_m$; a binary "0" is electrically manifested by binary position $B_m$; and a binary "0" is electrically manifested by binary position $E_m$. It is apparent that the value electrically manifested by binary positions $A_n$ through $E_n$ and the value electrically manifested by binary positions $A_m$ through $E_m$ differ only in the E position. Namely, position $E_n$ electrically manifests a binary "1," whereas position $E_m$ electrically manifests a binary "0." Hence, it will be appreciated from the earlier discussion herein, that core 9 will traverse the hysteresis curve from remanent state D to point P and thereby induce a substantial voltage in the sense wires: whereas core 10 will traverse the hystersis curve in a negative direction from remanent state D, and therefore no appreciable voltage will be induced into the sense wire thereby. The substantial potential induced in the sense wire by the traversal of the positive going portion of the hysteresis curve by core 9 manifests the condition that the value electrically manifested by binary positions $A_n$ through $E_n$ is not equal to the value electrically manifested by binary positions $A_m$ through $E_m$.

Still referring to FIG. 1, it will be appreciated that when the binary word electrically manifested by binary positions $A_n$ through $E_n$ differs from the binary word electrically manifested by binary position $A_m$ through $E_m$ in a number of positions, that the magnitude of the voltage induced on the sense wire will be substantially in direct proportion to the number of binary positions in which they differ. This is a useful and practical feature of applicant's invention. This feature permits one to determine by practicing applicant's invention, how many bit positions of the binary word electrically manifested by positions $A_n$ through $E_n$ differ from the bit positions of the binary word electrically manifested by positions $A_m$ through $E_m$.

As will be apparent to those skilled in the art, the practice of applicant's invention is not limited to the particular structural embodiment shown in FIG. 1. For example, the blocks represented by $A_n$ through $E_n$ and blocks $A_m$ through $E_m$ may respectively be any circuitry that renders binary manifestations in complementary form.

Further, applicant's invention may be practiced with any number of binary positions. Still further, although positive and negative potentials were used earlier herein for purposes of illustration, it will be appreciated that any arrangement which causes one core corresponding to each bit position compared to traverse a major flux changing portion of the hysteresis curve in response to non-identity and the other core in said bit position to traverse a very minor flux changing portion of the hysteresis curve in response to non-identity, will accomplish the practice of applicant's invention. Still further, applicant's invention may be practiced in a structural embodiment where identity between a first binary word and a second binary word renders a substantial flux changing traversal of the hysteresis curve, and correspondingly the larger of two output voltages on the sense line.

It will be appreciated that by selectively gating the binary information, or by employing a plurality of sense wires, selected portions of one binary word may be compared to selected portions of another binary word, and thereby a ready determination can be made as to the bit position, wherein a lack of identity exists. Further it will be appreciated that by a suitable gating arrangement, or by employing a number of windings selectively gated to drive the cores corresponding to the bit positions thereof, a single word may be compared successively to a plurality of words and a plurality of discrete manifestations rendered respectively indicative of identity and lack of identity between said one word and each of said plurality of words.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A binary comparator for comparing a first binary digit with a second binary digit and rendering a first electrical manifestation when said first and second binary digits are identical and a second electrical manifestation when said first and second binary digits are non-identical, said binary comparator consisting in combination of: a first magnetic core having two stable magnetic states; a second magnetic core having two stable magnetic states; a first lead electro-magnetically coupled to said first magnetic core and manifesting a first electrical condition when said first binary digit is a binary "1" and a second electrical condition when said first binary digit is a binary "0"; a second lead electromagnetically coupled to said second magnetic core and manifesting a first electrical condition when said first binary digit is a binary "0" and a second electrical condition when said first binary digit is a binary "1"; a third lead electromagnetically coupled to said second magnetic core and manifesting a first electrical condition when said second binary digit is a binary "1" and a second electrical condition when said second binary digit is a binary "0"; a fourth lead electromagnetically coupled to said first magnetic core and manifesting a first electrical condition when said second binary digit is a binary "0" and a second electrical condition when said second binary digit is a binary "1"; and a sense wire electromagnetically coupled to said first and second magnetic cores, whereby a first electrical manifestation will appear on said sense wire when said first and said second binary digits are identical and a second electrical manifestation will appear on said sense wire when said first and said second binary digits are non-identical.

2. A magnetic core comparator for comparing a first N binary digit word with a second N binary digit word and rendering a first output when said first and second binary words are identical, and a second output when said first and second binary words are lacking in identity, said magnetic core comparator consisting of N binary comparators each consisting of the structure recited in claim 1 and employing a single sense wire electromagnetically coupled to each core of each of said N binary comparators.

3. A binary comparator for comparing a first binary digit with a second binary digit and rendering a first electrical manifestation when said first and second binary digits are identical and a second electrical manifestation when said first and second binary digits are non-identical, said binary comparator consisting in combination of: a first magnetic element having two stable magnetic states; a second magnetic element having two stable magnetic states; first means electromagnetically coupled to said first magnetic core and manifesting a first electrical condition when said first binary digit is a binary "1" and a second electrical condition when said first binary digit is a binary "0"; second means electromagnetically coupled to said second magnetic core and manifesting a first electrical condition when said first binary digit is a binary "0" and a second electrical condition when said first binary digit is a binary "1"; third means electromagnetically coupled to said second magnetic core and manifesting a first electrical condition when said second binary digit is a binary "1" and a second electrical condition when said second binary digit is a binary "0"; fourth means electromagnetically coupled to said first magnetic core and manifesting a first electrical condition when said second binary digit is a binary "0" and a second electrical condition when said second binary digit is a binary "1"; and sensing means electromagnetically coupled to said first and second magnetic cores, whereby a first electrical manifestation will appear on said sense wire when said first and said second binary digits are identical and a second electrical manifestation will appear on said sense wire when said first and said second binary digits are non-identical.

4. A multi-digit binary comparator for comparing a first N binary digit word with a second N binary digit word and rendering a first output when said first and second binary words are identical and a second output when said first and second binary words are lacking in identity, said multi-digit binary comparator consisting of N binary comparators each consisting of the structure recited in claim 3 and employing a single sense wire electromagnetically coupled to each core of each of said N binary comparators.

References Cited in the file of this patent

UNITED STATES PATENTS

| | | |
|---|---|---|
| 2,729,808 | Auerbach | Jan. 3, 1956 |
| 2,819,456 | Stuart-Williams | Jan. 7, 1958 |
| 2,845,220 | Bensky | July 29, 1958 |
| 2,905,931 | Lubkin | Sept. 22, 1959 |